July 11, 1939.  C. H. ARNOLD  2,165,439
CASH REGISTER
Original Filed June 16, 1934   9 Sheets-Sheet 1

Inventor
Charles H. Arnold
By Earl Beust
His Attorney

July 11, 1939.   C. H. ARNOLD   2,165,439
CASH REGISTER
Original Filed June 16, 1934   9 Sheets-Sheet 2

Inventor
Charles H. Arnold
By Cearl Berest
His Attorney

July 11, 1939.  C. H. ARNOLD  2,165,439
CASH REGISTER
Original Filed June 16, 1934    9 Sheets-Sheet 4
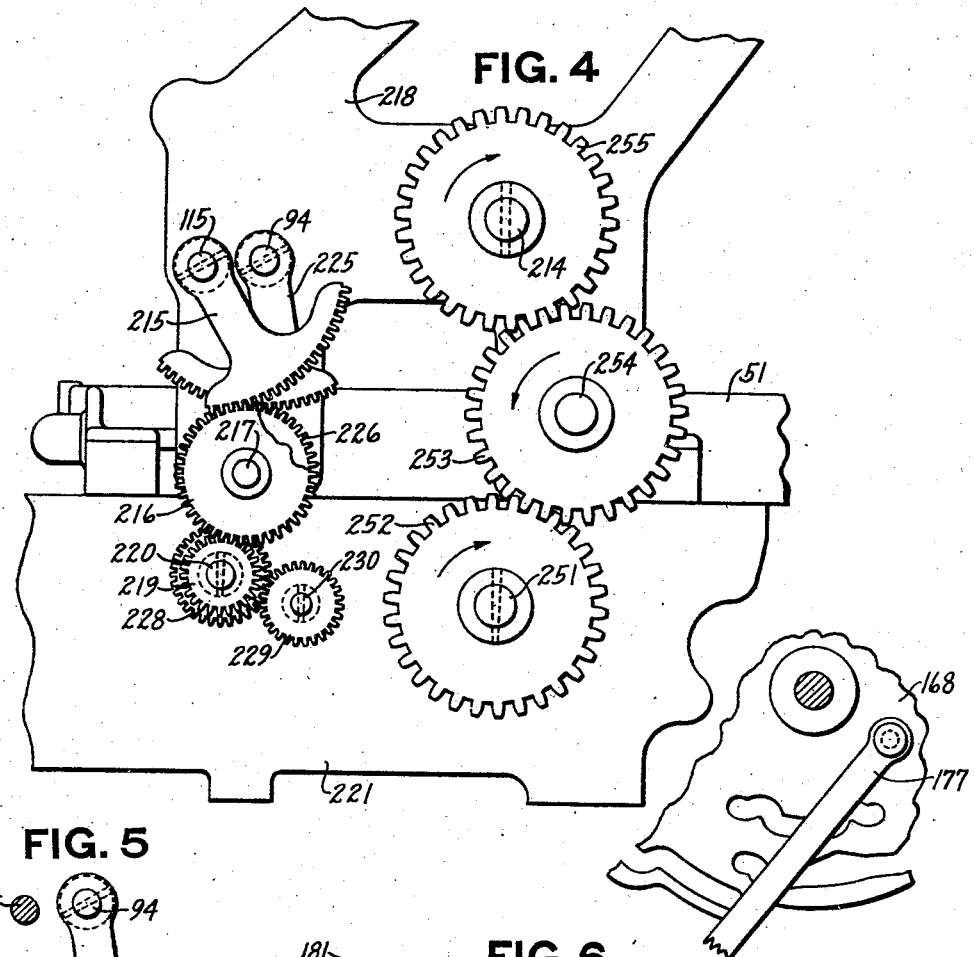
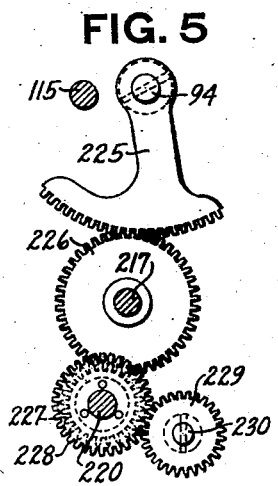
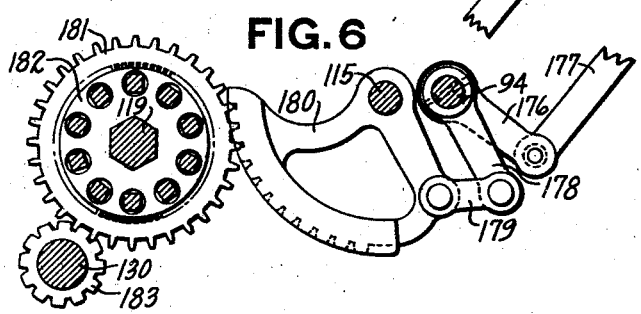
Inventor
Charles H. Arnold
By Carl Bennett
His Attorney July 11, 1939.  C. H. ARNOLD  2,165,439
CASH REGISTER
Original Filed June 16, 1934   9 Sheets-Sheet 5
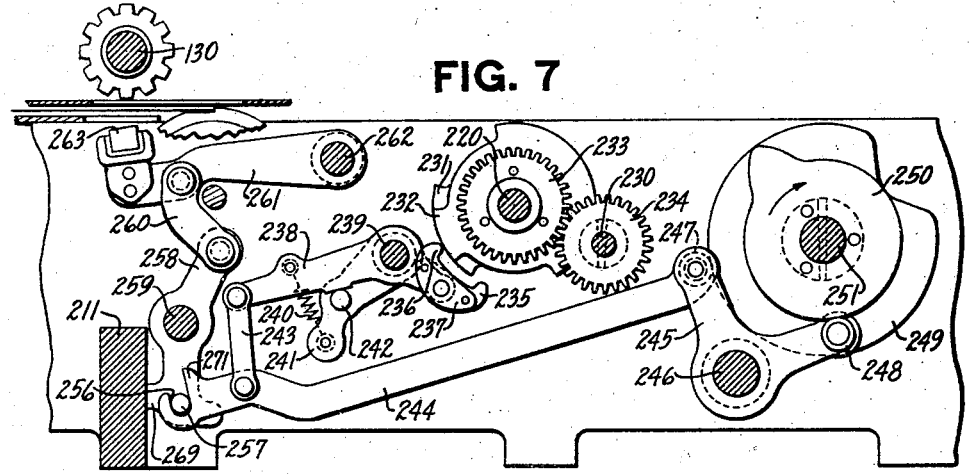
FIG. 7
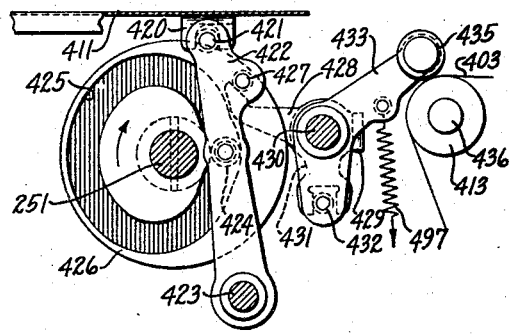
FIG. 8
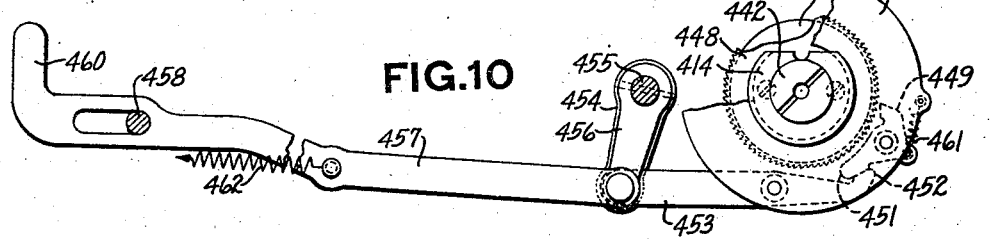
FIG. 9
FIG. 10
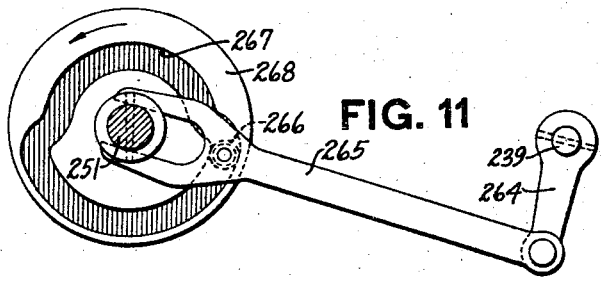
FIG. 11
Inventor
Charles H. Arnold
By *Earl Benst*
His Attorney

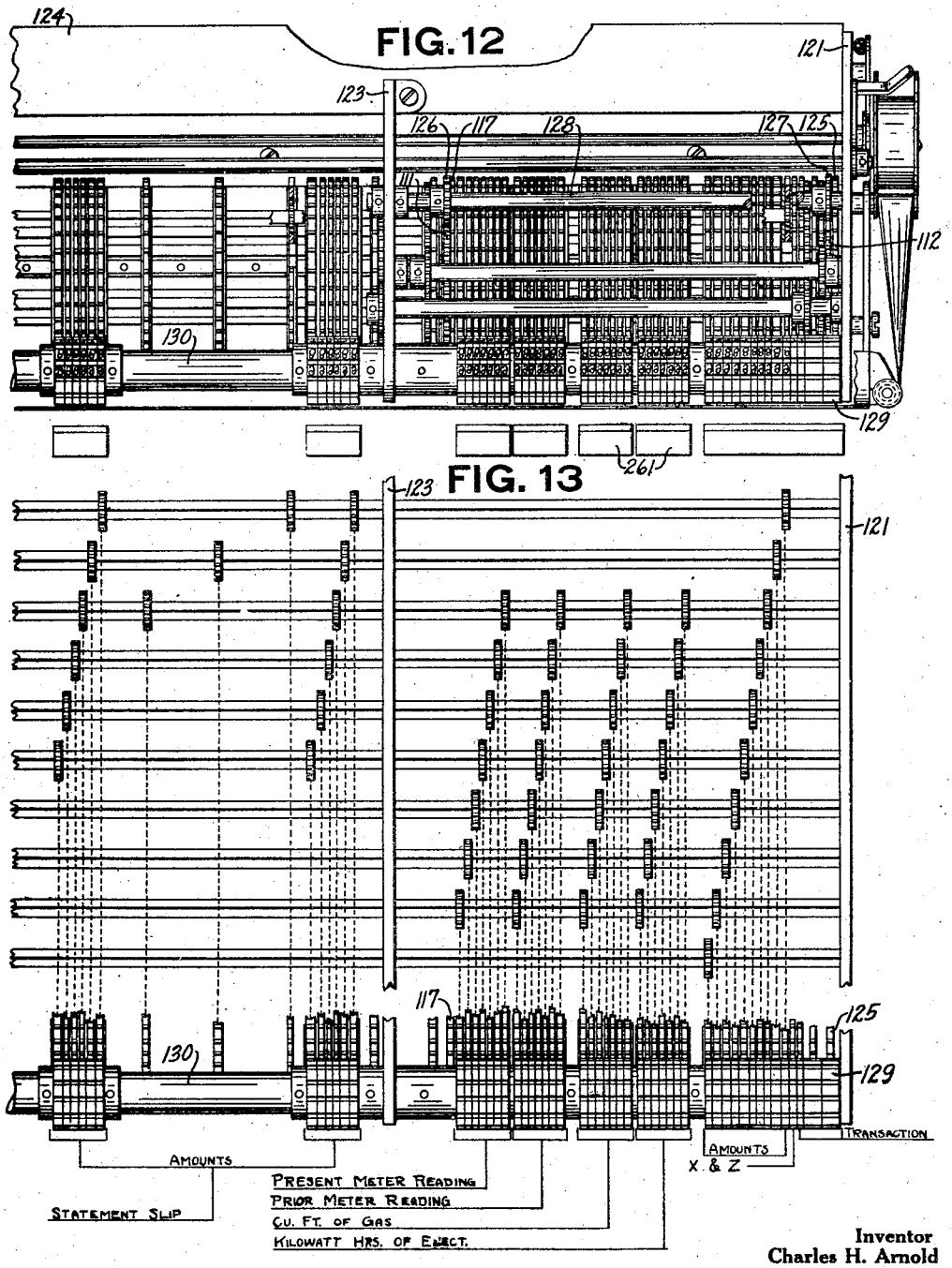

July 11, 1939.  C. H. ARNOLD  2,165,439
CASH REGISTER
Original Filed June 16, 1934  9 Sheets-Sheet 7

Inventor
Charles H. Arnold
By
Earl Beust
His Attorney

July 11, 1939.  C. H. ARNOLD  2,165,439
CASH REGISTER
Original Filed June 16, 1934   9 Sheets-Sheet 8
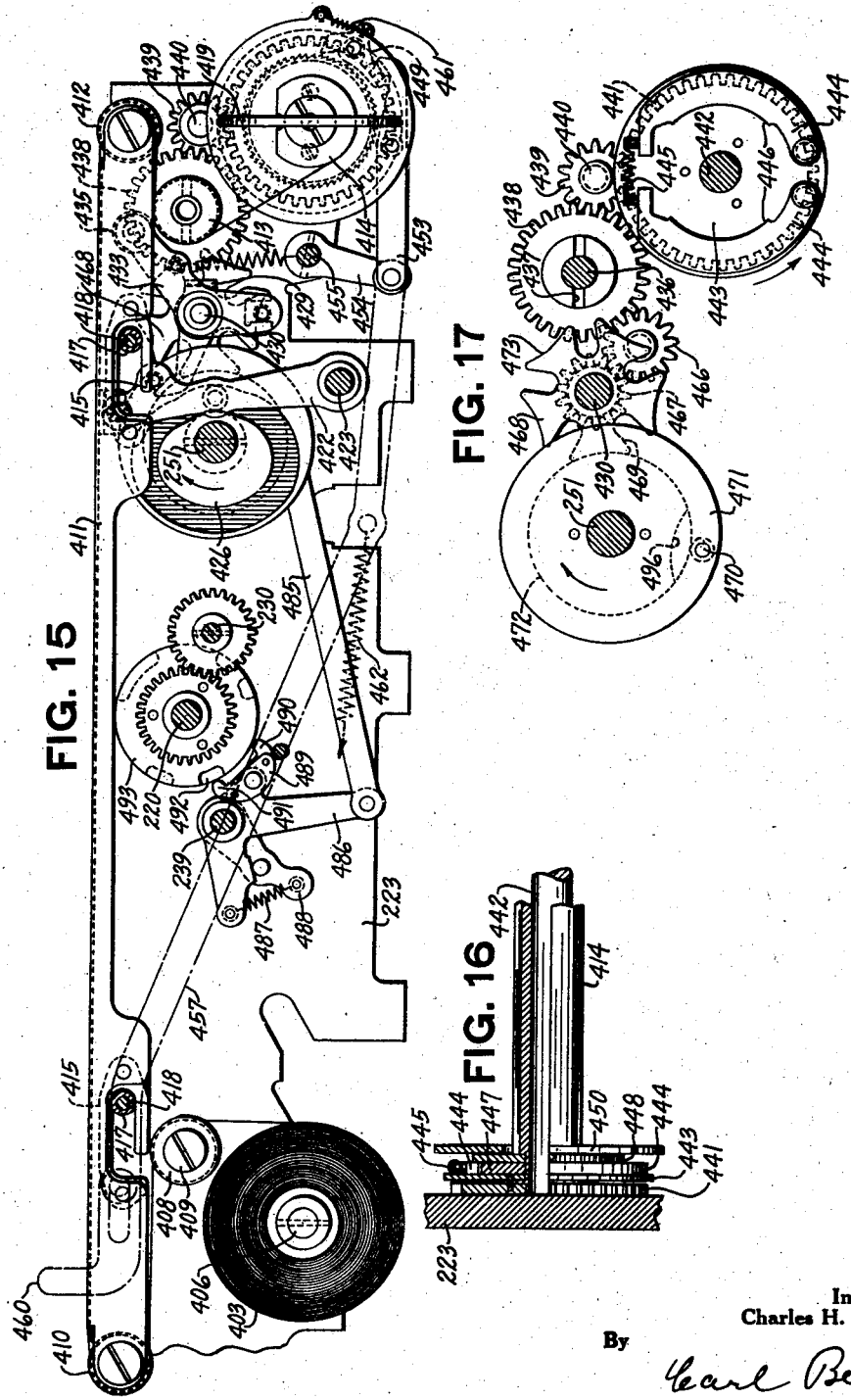
Inventor
Charles H. Arnold
By  Earl Bent
His Attorney July 11, 1939.  C. H. ARNOLD  2,165,439
CASH REGISTER
Original Filed June 16, 1934  9 Sheets—Sheet 9
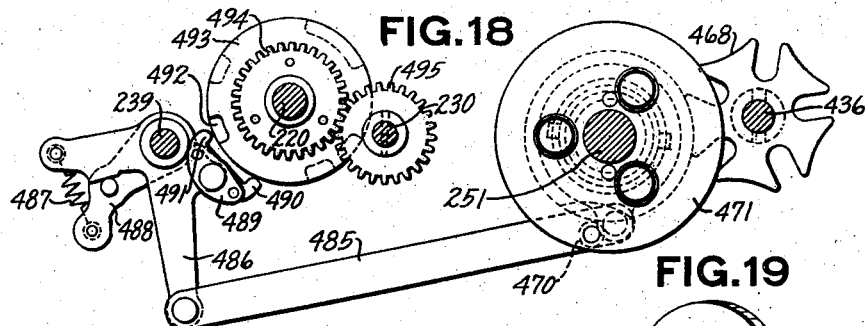
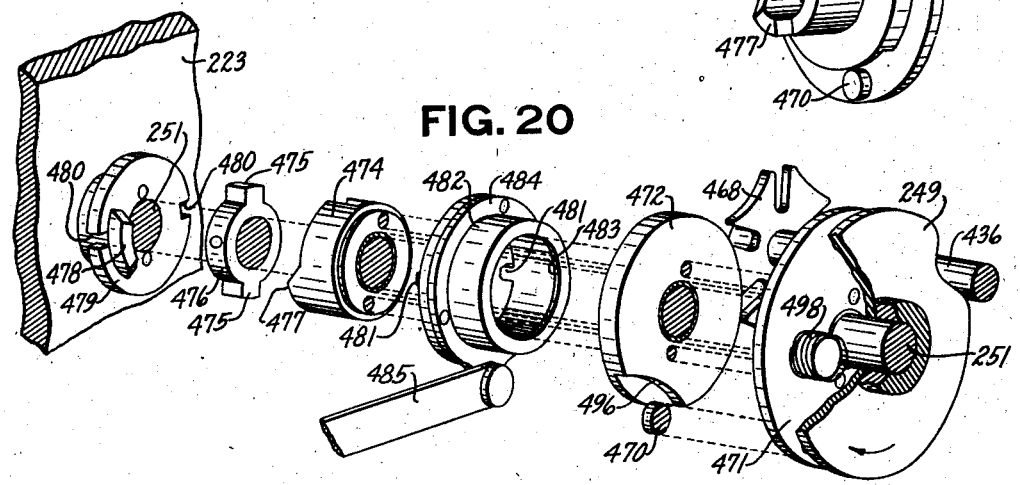
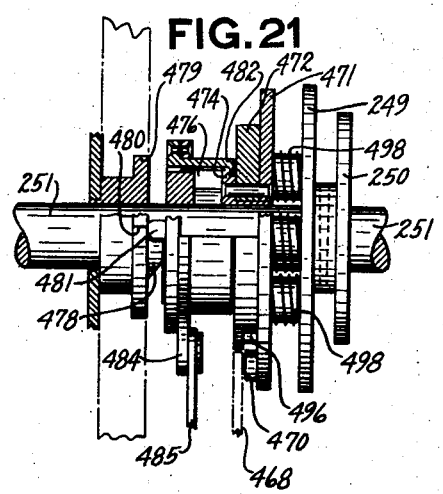
Inventor
Charles H. Arnold
By
His Attorney Patented July 11, 1939

2,165,439

UNITED STATES PATENT OFFICE 2,165,439

CASH REGISTER

Charles H. Arnold, Dayton, Ohio, assignor to The National Cash Register Company, Dayton, Ohio, a corporation of Maryland Original application June 16, 1934, Serial No. 730,880. Divided and this application July 10, 1936, Serial No. 89,880

9 Claims. (Cl. 101—288)

This invention relates to improvements in cash registers of the type illustrated and described in Letters Patent of the United States Nos. 1,619,796, 1,747,397, and 1,761,542, issued respectively March 1, 1927, February 18, 1930, and June 3, 1930, to B. M. Shipley, and the copending application of M. M. Goldberg filed August 27, 1931, Serial No. 559,720, and is a division of application Serial No. 730,880, filed June 16, 1934, which issued as Patent No. 2,141,332 on December 27, 1938.

It is generally the custom for public utility companies that supply communities with electrical current and gas, to furnish their numerous subscribers with a periodical statement of their accounts. In addition to furnishing statements of accounts to subscribers, a record of those accounts is also kept by the company, and, in the present case, such a record is printed by the machine on an audit strip having mechanism for giving the proper feed to the strip at the proper time, depending upon the type of operation being performed by the machine.

Therefore it is broadly an object of this invention to provide a cash register which will simultaneously print various data and amounts in the several columns on record material.

Another object of the present invention is to provide novel means for feeding the audit strip.

A further object is to furnish novel and selective mechanism controlled by the transaction keys and the total keys for controlling the audit strip feeding mechanism and the impression mechanism.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 4 is a side elevation showing the mechanism for operating the printer and the selective controlling means therefor.

Fig. 5 is a detail view of part of the mechanism illustrated in Fig. 4.

Fig. 6 is a detail view of a part of the mechanism for transmitting differential movement of the total control plate to the read and reset type wheel.

Fig. 7 is a side elevation as observed from the right of the machine illustrating the impression selecting and operating mechanism.

Fig. 8 is a facsimile of a fragment of an audit strip used in the machine embodying the present invention.

Fig. 9 is a detail view of the cam and arm that move the detail or audit strip to and from printing position and that also actuates the detail strip tension mechanism.

Fig. 10 is a detail view illustrating the mechanism for feeding the detail strip by hand.

Fig. 11 is a detail view of the mechanism for operating the impression feeler shaft.

Fig. 12 shows the detail strip printing mechanism as viewed from the front.

Fig. 13 is a diagrammatic view of the type wheel driving lines for the detail strip.

Fig. 15 is a side elevation as observed from the right of the machine showing in general the audit strip feeding mechanism.

Fig. 16 is a fragmentary sectional view of the audit strip receiving roll.

Fig. 17 is a side view illustrating the audit strip feeding mechanism.

Fig. 18 is a detail view of the mechanism for selectively enabling or disabling the audit strip feeding mechanism.

Fig. 19 is a detail view in perspective of the Geneva gear drive plate.

Fig. 20 is a disassembled view in perspective of the audit strip feeding and controlling mechanism.

Fig. 21 is a front assembled view, partly sectioned, of the mechanism shown in Fig. 20.

GENERAL DESCRIPTION

In its present embodiment the machine embracing the instant invention is arranged for use by public utility companies that supply electrical current and gas to a plurality of consumers. However, it is not intended to limit this machine to any one system or use, as, with slight alteration, it may be adapted for use in many other ways, all coming within the scope of this invention.

Described in general terms, the present invention is embodied in the well known type of cash register illustrated and described in the patents and applications referred to at the beginning of this specification. This machine is equipped with a column type printer located at the front of the machine, said printer being arranged to print in duplicate various amounts and data in the various columns of an insertable slip during one machine operation. In addition, a record of each transaction is printed in columnar alinement on an audit strip located at the right of the machine.

Selecting mechanism, controlled by the transaction keys and total control keys and automatically controlled in certain instances, governs the functioning of the printing hammers to cause printing in the proper columns, and likewise controls the audit strip feeding mechanism.

All the mechanism pertinent to the present invention will now be described in detail.

DETAILED DESCRIPTION

The present invention is embodied in the type of register illustrated and described in the patents referred to at the beginning of this specification. As machines of this character are well known in the art, the mechanism thereof having no direct bearing on the present invention will be but briefly described.

*Machine framework and operating mechanism*

Figure 2:
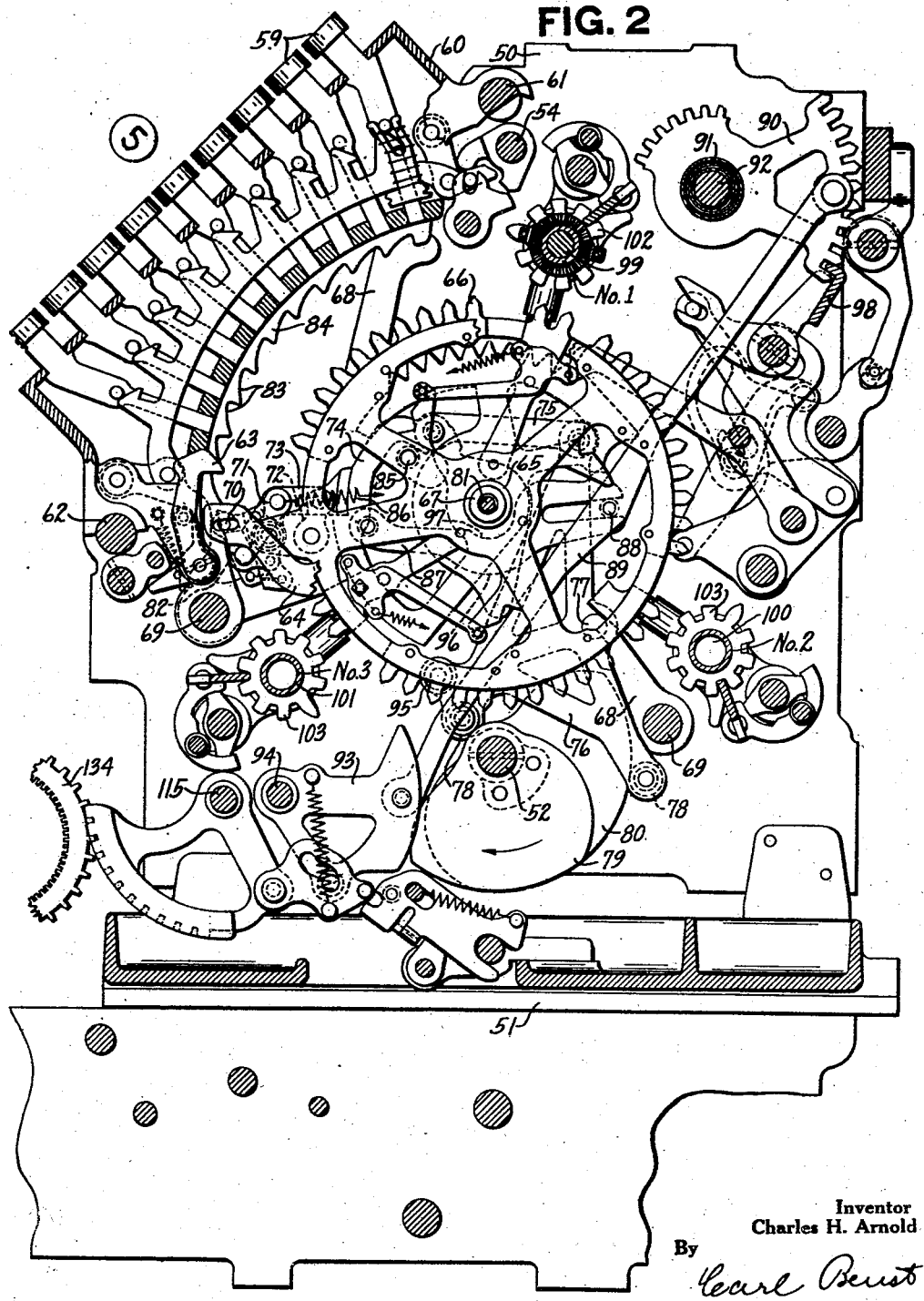
Fig. 2 is a sectional view showing in particular an amount bank and its associated differential mechanism.
Figure 3:
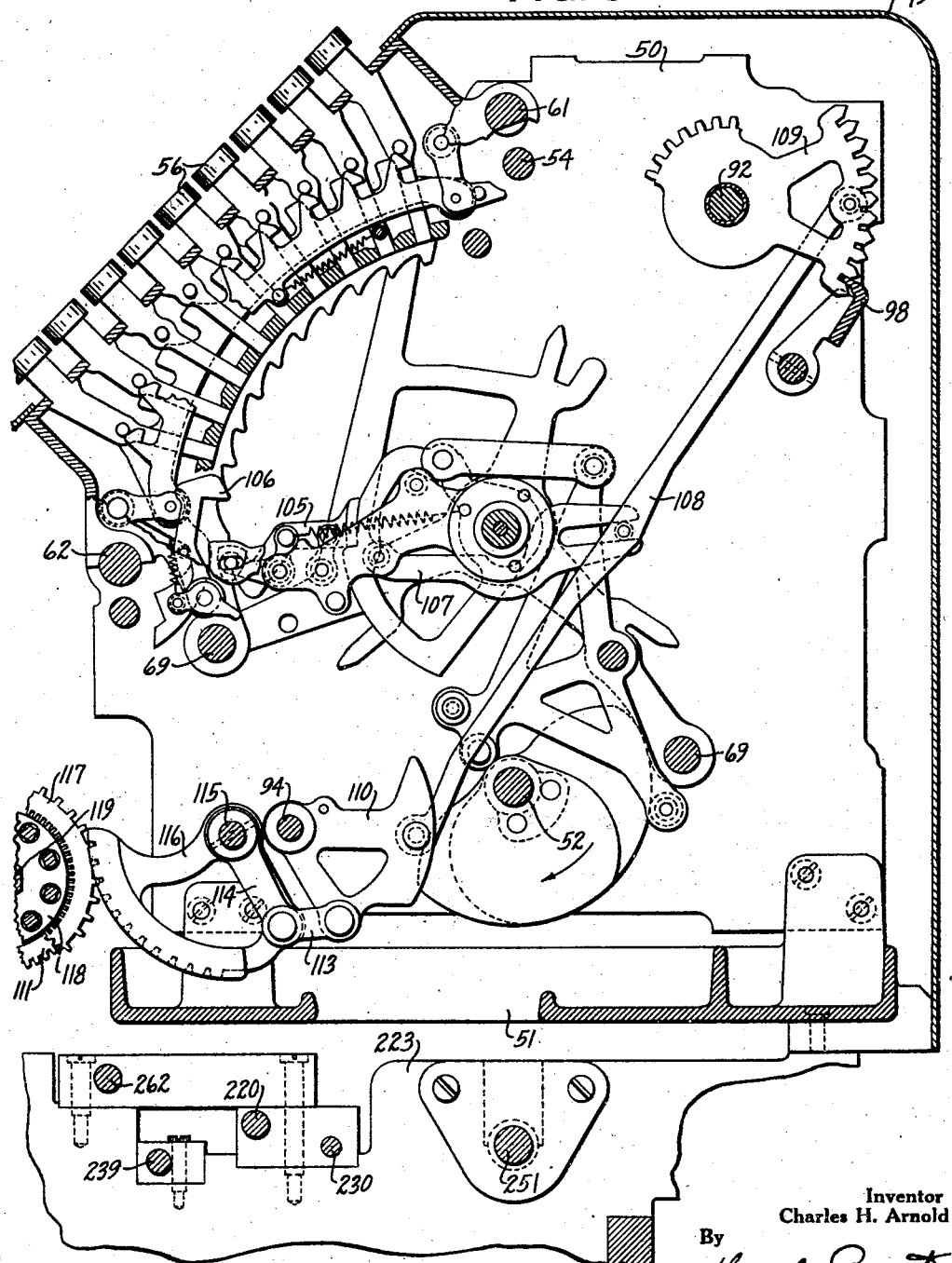
Fig. 3 is a sectional view showing a transaction bank and its associated differential mechanism.

Calling attention to Figs. 2 and 3, the mechanism of the machine proper is supported by two main frames 50, only one (the left frame) being here shown, and various other intermediate frames, cross frames, and braces. The main frames are in turn secured to a machine base 51 and the entire machine is enclosed in a suitable cabinet 49 also secured to the machine base 51.

As a general rule, the machine is operated by means of the usual electric motor (not shown) which is operatively connected to the main drive shaft 52 by the usual clutch mechanism and gearing.

Depressing the usual motor bar 53 (Fig. 1) releases a key lock shaft 54 (Fig. 2) for a slight clockwise movement under influence of a spring. This movement of the shaft 54 engages the clutch mechanism and closes the electrical circuit to the motor, thereby causing the machine to operate. Near the end of the machine operation, the shaft 54 is rocked counter-clockwise to release the depressed keys, disengage the clutch mechanism, and simultaneously open the motor switch in the usual manner.

If desired, or when electrical current is not available, the machine may be operated by means of a hand crank which is operatively connected to the main drive shaft 52 by means of a train of gears. Depressing the starting bar 53 (Fig. 1) releases the shaft 52 for rotation, as explained hereinbefore. The machine may then be operated by turning the hand crank.

As the motor, clutch, and releasing mechanism are of conventional design and old in the art, they have not been illustrated herein and will not be further described. However, reference may be had to the Shipley Patent No. 1,-761,542 issued June 3, 1930, for a full disclosure of this operating mechanism.

*Keyboard*

Figure 1:
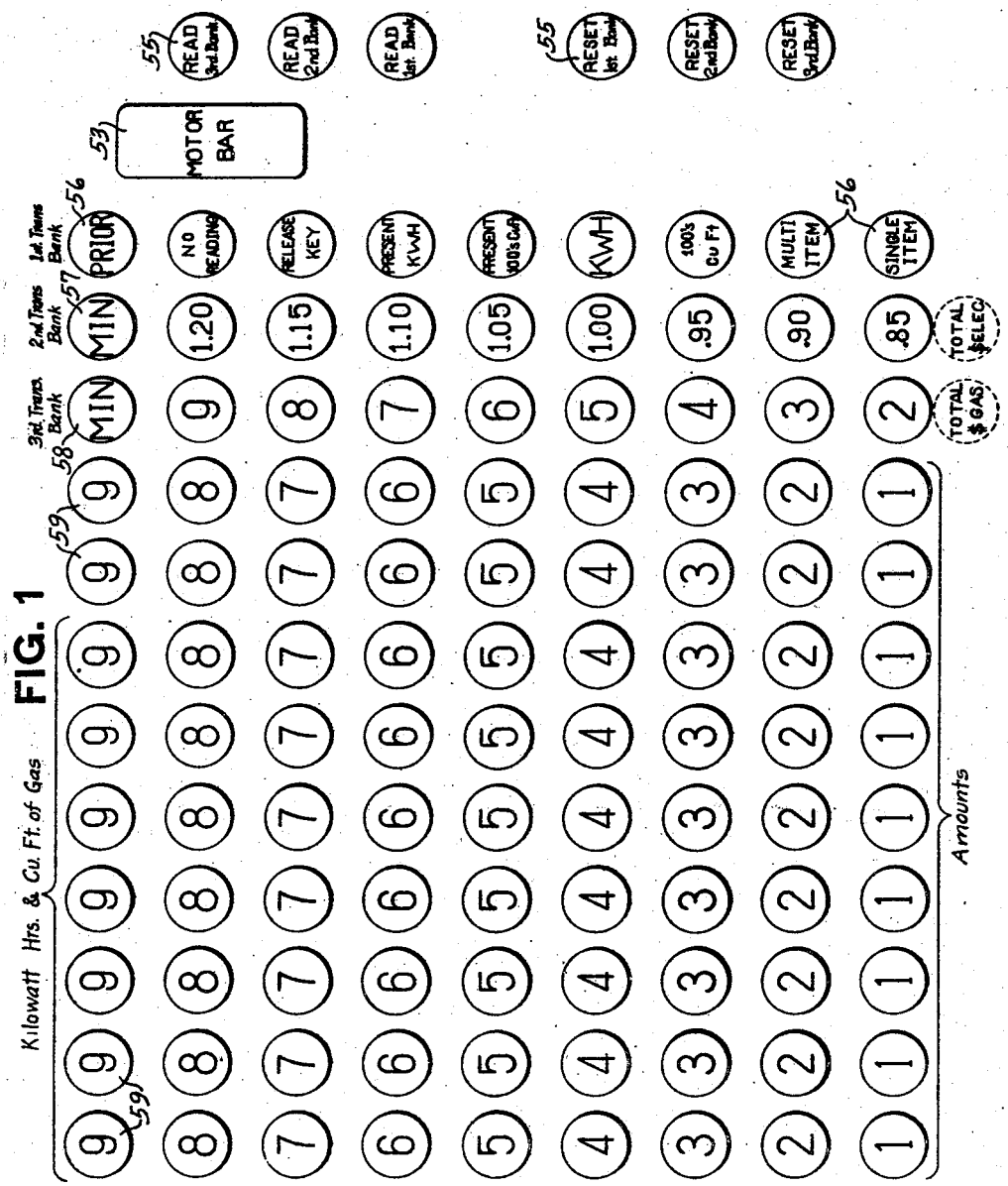
Fig. 1 is a diagrammatic view of the keyboard of the machine of the present invention.

Fig. 1 is a diagrammatic view of a typical keyboard arrangement for use by public utility companies.

Located at the extreme right of the keyboard is a series of total control keys 55 which controls the reading and resetting of the different totalizers. Next in order is the motor bar 53, which, as previously stated, controls the operation of the machine. Next are three rows of transaction keys 56, 57, and 58, which select the different totalizers for engagement with their actuators in a manner later to be described. As presently constructed, the machine of this invention has nine rows of amount keys 59, which control the positioning of the differential actuators in the well known manner.

*Amount keys and differential mechanism*

As previously stated, the machine of this invention has nine banks 60 of amount keys 59, and, as all the amount banks and their associated differential mechanisms are similar, it is thought that the description of one denominational unit will be sufficient for the purpose of this invention.

Referring to Fig. 2, the amount key banks 60 are removably supported on rods 61 and 62 extending between and supported by the main machine frames 50. Pivoted on the lower end of each amount bank is a zero stop lever 63 having a right-angled projection arranged to cooperate with the forward end of a reset spider 64 pivoted on a hub 65 of an amount differential actuator 66. The actuator 66 is loosely mounted on a hub 67 extending between two differential support plates 68 (only one here shown) supported by a pair of rods 69 extending between the main frames 50. The spider 64 has in its forward end a slot through which extends a stud 70 in a differential latch arm 71 pivoted to the actuator 66.

Mounted for lateral shifting movement by means of the arm 71 and a similar arm 72, is a differential latch 73, a foot-shaped projection of which is arranged to cooperate with a differential driving segment 74 pivoted on the hub 67, and connected by a link 75 to a lever 76 journaled on a stud 77 secured in one of the plates 68. The lever 76 carries a pair of rollers 78 which cooperate with the peripheries of companion cams 79 and 80 secured on the main drive shaft 52.

In adding operations, the shaft 52 and the cams 79 and 80 make one complete revolution clockwise, which, by means of the lever 76 and the link 75, rocks the driving segment 74 first in a clockwise direction and then back to normal position.

As previously stated, there is a differential actuator unit like that explained above for each amount bank, and each differential unit is supported between two of the plates 68. The complete assembly of differential units are held together by means of a rod 81 extending through the hubs 76.

If no key is depressed in an amount bank, the zero stop lever 63 engages the forward end of the reset spider 64 to rock the latch arm 71 counter-clockwise to move the differential latch 73 forwardly, thereby disengaging the foot thereof from the depression in the driving segment 74 and engaging a nose 82 of said latch with one of a series of notches 83 in a plate 84 secured to one of the plates 68. This stops the differential actuator 66 in zero position by disengaging said latch from the driving segment 74.

The concentric portion of the segment 74, in cooperation with the foot of the latch 82, maintains the nose of said latch in engagement with the plate 84 while said segment completes its initial movement clockwise and during the greater part of the return movement of said segment until the depression therein is opposite the foot of the latch 82. When the depression is opposite the foot of the latch 82, a flat surface of the segment 74 engages a stud 85 in the actuator 66 and returns said actuator to home position, thereby disengaging the reset spider 64 from the zero stop lever 63 and allowing a spring 86 to disengage the nose 82 of the latch 73 from the notch in the plate 84 and to reengage the foot of said latch with the depression in the driving segment 74.

Depressing one of the amount keys 59 forces the lower end of the stem thereof into the path of the latch arm 71. Consequently, initial movement clockwise of the segment 74 and the actuator 66 causes said arm 71 to engage the stem of said key to disengage the foot of the latch 73 from the segment 74 in exactly the same manner as explained above. On its return movement the segment 74 engages the stud 85 to return the actuator 66 and disengage the latch 73, as described above.

It will be also understood that depression of an amount key 59 rocks the zero stop lever 63 counter-clockwise out of the path of the spider 64, thereby allowing the actuator 66 to travel clockwise until stopped by the depressed amount key.

The differential positioning of the actuator 66 is transmitted to the indicator and printing mechanisms by means of a beam 87 pivoted on said actuator 66 and bifurcated to embrace a stud 88 in a link 89, the upper end of which is pivoted to an indicator segment 90 supported by one of a series of indicator tubes 91 on an indicator shaft 92, opposite ends of which are supported by the main frame 50. The lower end of the link 89 is pivoted to a printer segment 93 turnably supported on a rod 94, opposite ends of which are carried by the main frames 50.

After the actuator 66 has been positioned under the control of a depressed amount key, as explained earlier herein, or under the control of the totalizer wheel in total taking operations, in a manner later to be described, a roller 95 carried by the lever 76 engages an arcuate surface 96 of the beam 87 to force an arcuate surface 97 of said beam into contact with the hub 65. This, by means of the link 89, positions the segments 90 and 93 commensurate with the position of the actuator 66. The segments 90 and 93 in turn position the indicator mechanism and the printing mechanism in accordance with the amount set up on the keyboard or in total taking operations in accordance with the amount on the wheel of the totalizer being read or reset. Later on in this specification, the manner in which the segment 93 positions the type wheel will be explained.

An alining bar 98 (Fig. 2) cooperates with the segment 90 to maintain the indicator mechanism in position after the lever 76 has returned to home position, as here shown. At the beginning of machine operations the aliner 98 is disengaged from the segment 90 and is reengaged therewith after said segment 90 has been positioned as explained above.

*Totalizers and transaction keys*

By observing Fig. 2 it will be seen that the present machine has three lines of totalizers, an upper totalizer 99, a rear totalizer 100, and a front totalizer 101. The upper totalizer 99 is an add-subtract totalizer and has an add wheel and a subtract wheel 102 for each denominational unit, said wheels being reversely geared together so that one is always complementary to the other. In addition to the adding and subtracting wheels 102, the upper totalizer line has a plurality of sets of adding wheels which function in exactly the same manner as the front and rear totalizer wheels. The wheels of the upper totalizer line are shiftable laterally in relation to the actuators 66 under control of the first row of transaction keys 56 in the usual manner.

The rear and front totalizer lines each carry a plurality of sets of totalizer wheels 103 adapted to be selected, in the usual and well known manner, for alinement with the actuators 66 by the second and third rows of transaction keys 57 and 58 respectively. There is also a set of grand totalizer wheels on the front totalizer line arranged to be selected by depression of any of the keys 57 in the second transaction bank and a similar set of totalizer wheels on the rear totalizer line selected in a like manner by the keys 58 in the third transaction bank.

It will be noted by referring to Fig. 2 that the actuator 66 has three sets of gear teeth which cooperate respectively with the wheels on the three totalizer lines in the regular way.

Directing attention to Fig. 3, which is a sectional view of the first transaction bank and which is representative of all the transaction banks, it will be noted that the transaction banks have a latch mechanism 105 similar to the amount latch mechanism. This latch is broken or released in zero position by zero stop lever 106 and in other positions under control of depressed transaction keys 56. The transaction latch 105 carries a beam 107 which, by means of a link 108, differentially positions the transaction indicator segment 109 secured on the shaft 92 and a printer segment 110 loose on the shaft 94.

In adding operations, selecting disks (not shown) controlled by the transaction banks cause the selected set of totalizer wheels to be engaged with the actuators 66 immediately after said actuators have completed their clockwise setting movement as explained earlier herein. Return movement counter-clockwise of the actuators rotates the wheels of the selected totalizer commensurate with the amount set up on the keyboard. Immediately after the actuators arrive at home position, the totalizer wheels are disengaged therefrom.

In total taking operations the different sets of totalizer wheels on the different lines are selected and alined with the actuators 66 by means of the transaction keys 56, 57, and 58 in exactly the same manner as described for adding operations. In total taking operations the different totalizer lines are selected for engagement with the actuators 66 by means of the total control keys 55 (Fig. 1). For example, depressing the first bank read key 55 in conjunction with one of the first transaction keys 56 will select the corresponding totalizer on the upper totalizer line for a reading operation. Likewise, using the first bank reset totalizer control key in conjunction with one of the keys 56 selects the corresponding totalizer of the upper totalizer line for a resetting operation.

This key operated total control mechanism is fully illustrated and described in copending application of M. M. Goldberg, Serial No. 559,720, referred to at the beginning of this specification.

In the present machine, adding operations are performed in one cycle of movement of the machine and total taking operations require two cycles of movement. In the first cycle of movement of a total taking operation, the wheels of the selected totalizer are alined with the actuators 66. Likewise, in this first cycle of movement the zero stop levers 63 (Fig. 2) break all the amount latches in zero position. At the beginning of the second cycle of a total taking operation the selected totalizer is engaged with the actuators 66 and the zero stop levers 63 are rocked out of the path of the spiders 64. Clockwise movement of the actuators revolves the wheels of the engaged totalizer in a reverse direction until they are stopped in zero position by means of a long tooth thereon. This positions the actuators commensurate with the amount on the totalizer wheels and return movement counter-clockwise of the actuators in turn positions the indicating and printing mechanisms in accordance with the amount on said totalizer wheels.

In reading operations the wheels of the selected totalizer remain in engagement with the actuators 66 during their return movement counter-clockwise. This rotates the wheels back to their original positions. In resetting operations the totalizer is disengaged from the actuators 66 before said actuators start their return movement counterclockwise, thereby leaving the totalizer wheels standing at zero. The usual transferring mechanism is employed for transferring amounts from lower to higher denominations.

*Printing mechanism*

The method of driving the columns of type wheels is by means of ring gears having external and internal teeth. The ring gears are differentially positioned by means of their external teeth and pinions driven by internal teeth thereof operate square shafts carrying similar pinions, one for each column in which printing is to be duplicated. These pinions drive other ring gears that drive the type carriers. This method of driving type wheels is fully explained in United States Patent No. 1,693,279 issued November 27, 1927, to Walter J. Kreider and therefore will be but briefly described herein.

In its present embodiment the instant machine is arranged to print various data and amounts in a plurality of columns on a statement sheet and on a detail strip in a single operation of the machine. This necessitates the identical setting of a series of type carriers and the method disclosed in the patent referred to above is admirably adapted for use in driving a column printing mechanism of this type. Due to the fact that the printer driving mechanism is substantially duplicated in each denominational unit, it is thought that the explanation of one denominational unit and one transaction blank will be sufficient for the purpose of this specification.

Directing attention to Figs. 3, 12, and 13, a link 113 pivotally connects the segment 110 to an arm 114 secured on a shaft 115 journaled in the main frames 50. Also secured on the shaft 115 is a gear segment 116 which meshes with a ring gear 117 rotatably supported on a disk 118 fast on a hexagonal shaft 119 supported by printer end plates 121, only one being shown, and intermediate plates 123, only one being shown. The upper ends of the plates 120, 121, 122, and 123 are supported by a bar 124 secured to the main frames 50 and their lower ends are secured to extensions of the base plate 51. The gear 117 (Figs. 3 and 12) has secured thereto a gear 111 which meshes with a pinion 126 fast on a shaft 128 which also carries a pinion 127 meshing with a gear 112 fast to the side of another ring gear 125. Therefore, movement of the gear 117 is transmitted to the gear 125 by means of the gears 111 and 112, pinions 126 and 127, and the shaft 128. The gear 125 meshes with a first transaction type carrier 129 loosely mounted on a shaft 130 fixedly supported by the printer plates 120 and 123 inclusive.

From the foregoing description it will be seen that the differential movement of the first transaction bank latch, by means of the mechanism just described, is transmitted to the first transaction bank type carrier 129.

The type wheel operating mechanisms for the second and third transaction banks will not be described in this divisional case.

*Selecting mechanism*

Selecting mechanism controlled by the first transaction bank and the total control keys 55 (Fig. 1) control the operation of the impression hammers and the feeding of the detail strip.

By observing Figs. 3 and 6 it will be remembered that the shaft 115 is differentially positioned in accordance with the first transaction bank latch, and that the shaft 94 is differentially positioned commensurate with the total control plate 168 through the link 177 and arm 176. Also, by means of an arm 178, link 179, segment 180, ring gear 181, and disk 182, an X and Z or read and reset type wheel 183 is positioned by the total control plate 168.

Secured on the shaft 115 (Fig. 4) is a gear segment 215 which meshes with an intermediate gear 216 loose on a stud 217 secured in an auxiliary end frame 218 supported by the base 51. The gear 216 meshes with a pinion 219 secured on a shaft 220 (Fig. 14) journaled in printer frames 221 and 223 secured in fixed relation to each other by bars 210 and 211 secured to a machine subbase (not shown).

Secured on the shaft 94 (Figs. 4 and 5) which, it will be recalled, is differentially positioned by the total control plate 168 is a gear segment 225 which meshes with an intermediate gear 226 loose on the stud 217 and which in turn meshes with a pinion 227 (see also Fig. 14) secured to a gear 228, both of which are rotatably supported by the shaft 220. The gear 228 meshes with a pinion 229 which drives a shaft 230 journaled in the frames 221 and 223. From the foregoing description it will be seen that the shafts 220 and 230 (Fig. 4) are differentially positioned respectively by means of the first bank of transaction keys 56 (Fig. 1) and by the total control keys 55.

*Impression hammer selecting and operating mechanism*

Fig. 7 illustrates the impression selecting and operating mechanism for one columnar unit of the column printer. As the mechanism is substantially duplicated in each column of the printer, including the audit strip section of the printer, it is felt that the description of one such columnar unit will be sufficient for all.

Each impression unit has two selecting disks 231 and 232 (Figs. 7 and 14), the former secured on the shaft 220 and the latter rotatably supported by said shaft 220 and having secured thereto a gear 233 which meshes with a pinion 234 secured on the shaft 230. The peripheries of the plates 231 and 232 cooperate respectively with projecting tips 235 and 236 of feeler arms 237 pivoted on an extension of a lever 238 loose on a shaft 239 journaled in frames 221 and 223. The lever 238 is flexibly connected by a spring 240 to an arm 241 secured on the shaft 239, and said spring 240 normally maintains a raised lower portion of the lever 238 in contact with a stud 242 carried by the arm 241. A link 243 pivotally connects the lever 238 to a link 244, the rearward end of which is pivoted to a bell crank 245 loose on a rod 246 supported by the frames 221 and 223. The bell crank 245 carries rollers 247 and 248, which cooperate respectively with the peripheries of companion cams 249 and 250 secured on a shaft 251 journaled in the frames 221 and 223.

Referring to Fig. 4, secured on the right hand end of the shaft 251 is a gear 252 which meshes with an intermediate gear 253 rotatably supported by a stud 254 carried by the plate 218. The intermediate gear 253 in turn meshes with a gear 255 secured on the right hand end of a printer drive shaft 214 journaled in the right frame 50 and the auxiliary frame 218. The shaft 214 is diametrically alined with the main drive shaft 52 and is operatively connected thereto by a clutch mechanism (not shown).

It will be recalled that in adding operations the main drive shaft 52 makes one complete clockwise rotation and in total taking operations it makes two complete clockwise rotations. In order to prevent the printing mechanism from making an unnecessary operation in total taking operations, the shaft 214 is automatically declutched from the shaft 52 during the first cycle of total taking operations. Consequently the shaft 214 makes only one clockwise revolution in adding and total taking operations and due to the fact that the gears 252 and 255 are identical, the shafts 214 and 251 move in synchronized relation.

Again directing attention to Fig. 7, the forward end of the link 244 has therein a notch 256 which cooperates with a stud 257 fast in a lever 258 turnably mounted on a rod 259 supported by the frames 221 and 223. A toggle link 260 pivotally connects the lever 258 to an impression hammer 261 (Fig. 7) rotatably mounted on a rod 262 also supported by the frames 221 and 223. The hammer 261 carries an impression block 263 adapted to cooperate with one column of type wheels on the line 130 to make impressions on material inserted between said impression blocks 263 and said type wheels.

Fig. 11 shows the shafts 239 and 251 as observed from the left of the machine. Secured on the shaft 239 (Fig. 14) is an arm 264 having pivoted thereto a pitman 265, the rearward end of which is bifurcated to straddle the shaft 251. The pitman 265 carries a roller 266 arranged to cooperate with a cam groove 267 in a box cam 268 secured on the shaft 251.

In the initial part of machine operations, the selecting plates 231 and 232 (Fig. 7) are differentially positioned by the mechanism shown in Fig. 4. Immediately thereafter the shaft 239 is rocked counter-clockwise as observed in Fig. 7 (clockwise as viewed in Fig. 11) by means of the mechanism shown in Fig. 11. If an undercut portion of the plates 231 or 232 is opposite the feeler projections 235 or 236, the spring 240 will move the lever 238 in unison with the arm 241 to disengage the notch in the forward end of the link 244 from the stud 257. Therefore, when the companion cams 249 and 250 rock the bell crank 245 first clockwise and then back to normal position, the link 244 will move idly back and forth without imparting any movement to the impression hammer 261. An extension 271 of the link 244 insures that the lever 258 is in its home position after an operation in which its associated hammer 261 is disabled.

However, if the largest diameter of the plates 231 and 232 is opposite the feeler tips or projections 235 and 236, counter-clockwise movement of the lever 238 will be effectively blocked and the shaft 239 and arm 241 will move independently thereof, flexing the spring 240. Consequently the notch in the link 244 will be retained in engagement with the stud 257 and initial movement clockwise of the bell crank 245, as explained above, will, by means of the link 244, rock the lever 258, and, by means of the toggle link 260, force the hammer 261 upwardly until the impression block 263 is pressed into engagement with its associated type wheels on the line 130. Final movement counter-clockwise of the bell crank 245 returns the lever 258 and the hammer 261 to normal position, in which position it is maintained by means of a projection 269 of the lever 258 contacting the supporting bar 211 for the frames 221 and 223.

The impression mechanism for each printing column is substantially the same as that just described with this exception: The undercut portions of the plates 231 and 232 and their relation to the feeler projections 235 and 236 are varied to properly control the printing of the columns they represent. In some of the columns the selecting plates 231 positioned by the total plate 168 alone control the operation of the hammers. In such cases the first transaction bank exercises no control whatsoever over the impression mechanism.

*Audit or detail strip feeding mechanism*

Most of the audit strip feeding mechanism is contained between the frames 221 and 223 (Fig. 14), while a small portion of the mechanism is mounted on the outside of the frame 221.

In the initial part of machine operation, a laterally slidable table moves a portion of the audit strip, wound therearound, rearwardly into printing position. After the impression is made, the slidable table is returned forwardly to return the audit strip from the impression mechanism so that the last impression thereon will be visible. After the impression is made and while the audit strip is being thus returned, the feeding thereof takes place.

Like the impression operating mechanism and the statement slip feeding mechanism, the audit strip feeding mechanism is under the selective control of the first transaction bank and the total control keys.

The audit strip receiving roll or reel is driven by a slippage member which insures the fed amount of the strip being wound thereon regardless of the circumference of the receiving roll. The audit strip feeding mechanism briefly outlined above will now be described in detail.

Figure 14:
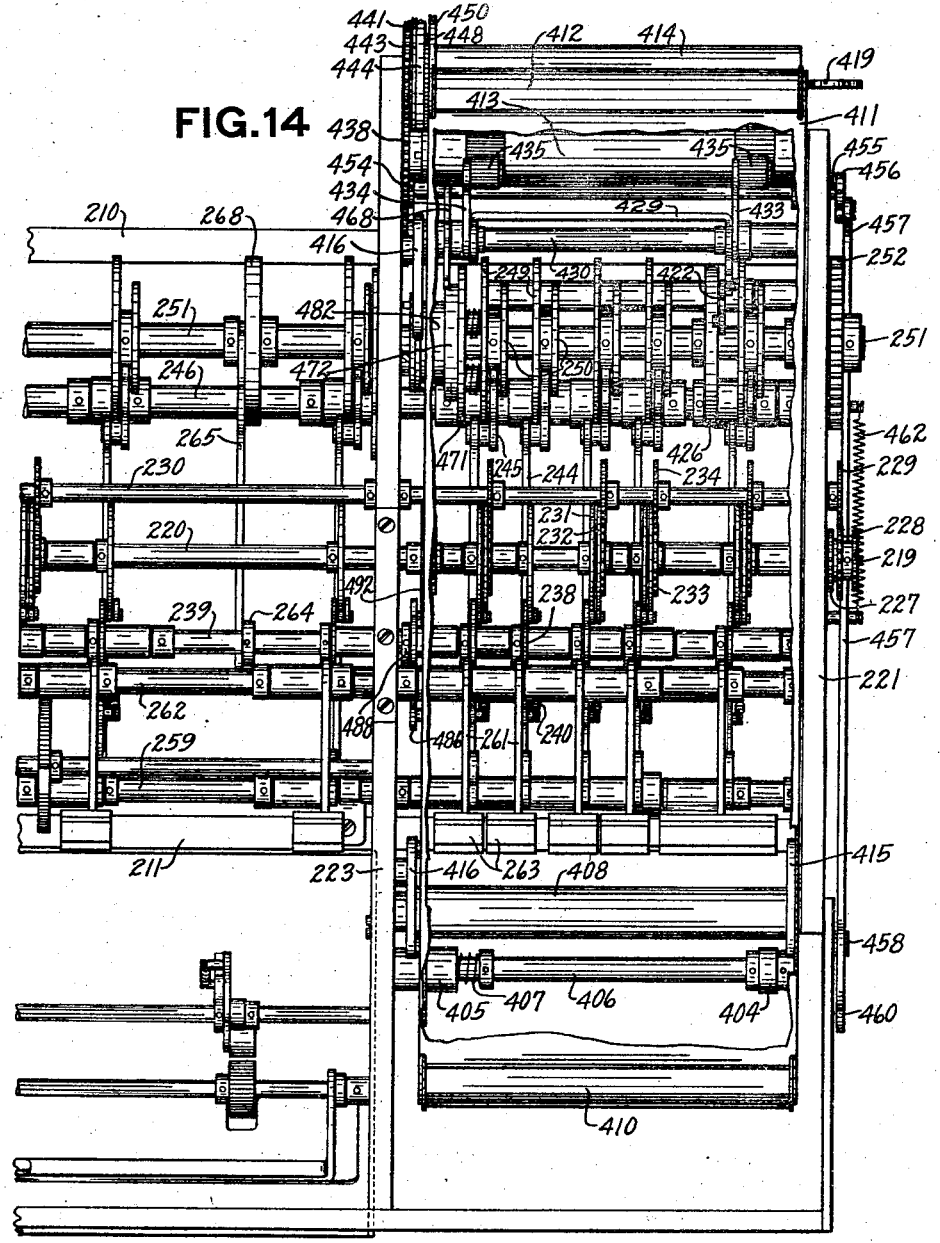
Fig. 14 is a top plan view of the printer impression and selective controlling mechanism and the audit strip feeding mechanism.

Referring to Figs. 14 and 15, the core of an audit strip supply roll 403 fits loosely over a bushing 404 and tight on a friction hub 405, both of which are loose on a rod 406 secured in the printer frame 223. A compression spring 407 provides a drag on the hub 405 to prevent the supply roll from unwinding too freely. The web of the audit strip is threaded around a flanged roll 408 loose on a stud 409 secured in the frame 223, thence around another flanged roll 410 supported by right-angled ears of an audit strip table 411. The audit strip is then carried across the face of the table 411, thence around a roller 412 supported at the rearward end of the table 411 in the same manner as the roll 410. The web of the audit strip continues around a feeding roll 413 and from the feeding roll it is attached to and wound upon a supply roll 414 by means of a key 419 in the well known manner.

The table 411 is supported for horizontal sliding movement between the frames 221 and 223 by means of opposed plates 415 and 416 secured on the bent-over sides of the table 411 and located near opposite ends thereof. The plates 415 and 416 each have slots adapted to receive rollers 417 loose on studs 418, two of which are secured in the frame 221 and two in the frame 223.

The audit strip table 411 (Figs. 9 and 14) carries a bracket 420 bifurcated to receive a stud 421 in a cam arm 422 loose on a stud 423 secured in the frame 421. The arm 422 carries a roller 424 which cooperates with a cam groove 425 in a box cam 426 secured on the shaft 251. Fast in the arm 422 is a stud 427 which cooperates with an extension 428 of a yoke 429 rotatably supported on a rod 430 extending between the frames 221 and 223. The yoke 429 has downwardly extending arms 431, bifurcated to straddle studs 432 carried by bell cranks 433 and 434 loose on the rod 430. The bell cranks 433 and 434 carry rollers 435 adapted to grip the audit strip 403 against the feed roll 413 in a manner presently to be described.

The feed roll 413 (Figs. 15 and 17) has tenons which engage a clutch 437, cut in the hub of a gear 438, loose on the rod 430. The gear 438 is operatively connected, by a pinion 439 loose on a stud 440 secured in the frame 223, to a gear 441 loose on a stud 442 secured in the frame 223. Said stud 442 also rotatably supports the receiving reel 414 (Fig. 16). Secured to the gear 441 is a plate 443 to which are pivoted the lower ends of symmetrical segments 444, between the upper free ends of which is stretched a spring 445. Concentric internal arcuate surfaces 446 of the segments 444 cooperate with the periphery of a disk 447 (see also Fig. 10) secured to the reel 414.

Secured between the disk 447 and the reel 414 is a ratchet wheel 448, adapted to cooperate with a pawl 449 pivoted on a plate 450 turnably supported on an undercut portion of the reel 414 between the ratchet 448 and said reel 414. The pawl 449 has a tail 451 which cooperates with a projection 452 of a link 453 pivotally connecting the plate 450 to an arm 454 secured on the left end of a shaft 455, opposite ends of which are journaled in the frames 221 and 223. Secured on the right hand end of the shaft 455 is an arm 456 to which is pivoted one end of a link 457 having therein a slot through which extends a stud 458 secured in the extension 344 of the frame 221 (see also Fig. 14). An upturned extension 460 on the link 457 protrudes through an opening in the machine cabinet and forms a convenient finger piece for operating the audit strip receiving reel by hand.

Forcing the link 457 (Figs. 10 and 15) rearwardly revolves the plate 450 and lowers the projection 452 of the link 453 to allow the pawl 449 to engage the ratchet 448 under tension of a spring 461. Continued rearward movement of the link 457 revolves the plate 450 counter-clockwise a distance determined by the stud 458 in cooperation with the slot in the link 457. This, by means of the pawl 449, also revolves the ratchet 448 and the reel 414 a like distance counter-clockwise to hand-feed the audit strip. A spring 462 returns the link 457 forwardly to normal position to disengage the pawl 449 from the ratchet 448.

An intermediate gear 466 (Fig. 17) pivoted on a stud secured in the frame 223 operatively connects the gear 438 to a pinion 467 secured to a Geneva gear 468 loose on the shaft 430. The Geneva gear 468 has a plurality of U-shaped slots 469 which cooperate with a stud 470 fast in a plate 471 loose on the shaft 251 (see also Figs. 18 and 20). Secured to the plate 471 is a Geneva disk 472, the periphery of which is adapted to cooperate with a series of arcuate surfaces 473 (Fig. 17) of the Geneva gear 468 to retain said Geneva gear in position when it is not being actuated by the stud 470.

Referring to Figs. 19, 20, and 21, integral with the plate 471 and the disk 472 is a hub 474 slotted to receive tenons 475 of a driving plate 476 secured on the shaft 251. A raised portion 477 of the face of the hub 474 cooperates with a camming lug 478 on the face of a bushing 479 secured in the frame 223 and forming a bearing for the shaft 251. The bushing 479 has symmetrical slots 480 which cooperate with tenons 481 of a bushing 482 loosely supported by the hub 474 and retained in position by means of a flange 483 on the bushing 482 which fits loosely in an annular groove formed between the hub 474 and the disk 472.

Secured on another flange of the bushing 482 is a plate 484 connected by a link 485 to a lever 486 (Fig. 18) loose on the shaft 239 and flexibly connected by a spring 487 to an arm 488 secured on the shaft 239. The lever 486 has pivoted thereon a feeler 489 with projecting fingers 490 and 491 which cooperate respectively with selecting disks 492 and 493. The disk 492 is secured on the shaft 220, while the disk 493 is loose on said shaft and has secured thereon a gear 494 which meshes with a gear 495 secured on the shaft 230.

Directing attention to Figs. 17, 20, and 21, the shaft 251 makes one complete clockwise rotation each machine operation. This, by means of the plate 476 and the hub 474, drives the disk 472 and the plate 471 in unison with said shaft 251. This causes the stud 470 on the plate 471 to engage one of the U-shaped notches 469 in the Geneva gear 468 to rotate said Geneva gear one increment of movement counter-clockwise. A cut-away portion 496 of the periphery of the disk 472 provides the clearance necessary to allow the Geneva gear 468 to rotate. Counter-clockwise movement of the Geneva gear 468 by means of the pinions 467 and 466 rotates the gear 438 and the feed roll 413 (see also Fig. 15). The gear 438, by means of the pinion 439, rotates the gear 441 and the plate 443 also in a counter-clockwise direction. The segments 444 being in frictional engagement with the disk 447 (Fig. 10) rotate the receiving reel 414 in unison with the plate 443.

Prior to the time that the stud 470 carried by the plate 471 engages and rotates the Geneva gear 468, the cam 426 (Figs. 9 and 15) rocks the lever 422 clockwise to move the stud 427 away from the extension 428 of the yoke 429. Springs 437 then urge the bell cranks 433 and 434 clockwise, causing the pressure rollers 435 to engage and press the audit strip 403 into contact with the feeding roller 413. The pressure rolls 435 continue to hold the audit strip 403 in contact with the feed roll 413 while the Geneva gear 468 is being rotated by the stud 470, which, as explained above, also rotates the feed roll and the receiving reel 414 in a counter-clockwise direction. This causes the feed roll 413 to unwind the audit strip web from the supply reel 403 after the impression mechanism has functioned and while the audit strip table 411 is being returned forwardly to normal position. As fast as the audit strip is fed by the feed roll 413 it is wound on the receiving reel 414.

The fact that the audit strip feed is the same each machine operation and that less movement of the receiving reel is required to wind the fed portion of the strip thereon when the diameter of the receiving roll increases, necessitates the friction connection, just described, between the plate 443 (Fig. 17), which has a constant or fixed movement each machine operation, and the receiving reel 414, the movement of which varies with the circumference of the receiving roll. Therefore, after the fed amount of the audit strip has been wound around the receiving roll, the shoes or segments 444 slip around the periphery of the disk 447 (Figs. 10 and 16) without imparting further movement to said receiving reel 414.

As in the case of the statement slip, it is sometimes necessary to make several impressions on a single line of the audit strip and this necessitates control of the feeding mechanism, which is accomplished by means of the selecting plates 492 and 493 (Figs. 15 and 18) and cooperating mechanism. Before the Geneva gear 468 receives its feeding movement, the shaft 239 and arm 488 are rocked counter-clockwise, as previously explained. If an undercut portion of the disks 492 or 493 is opposite the fingers 490 and 491 of the feeler 489, the lever 486, by means of the spring 487, is moved in unison with the arm 488. This, by means of the link 485, shifts the bushing 482 (Figs. 20 and 21) counter-clockwise to aline the tenons 481 with the symmetrical slots 480 in the bushing 479. When the machine is at rest and during the earlier part of the machine operation, when the shaft 239 receives its counter-clockwise movement, the raised portion 477 of the hub 474 is opposite camming lug 478 of the bushing 479.

Immediately after initial movement of the shaft 239 (Fig. 18) and the arm 488, which, as previously explained, causes the feeler 489 to feel for the low or undercut portion of the selecting disks 492 and 493, the raised surface 477 of the hub 474 moves beyond the lug 478. This allows a plurality of springs 498 loose on studs secured in the plate 471 and compressed between said plate 471 and one of the audit strip hammer operating cams 249 to shift the entire unit, consisting of the plate 471, disk 472, hub 474, and the bushing 482, toward the left, thus causing the lugs 481 to enter the slots 480 in the stationary bushing 479. This shifts the stud 470 into alinement with the Geneva gear 468 and also moves the recessed portion 496 of the disk 472 opposite the Geneva gear so that said stud 470 will engage and rotate said Geneva gear and associated mechanism to feed the audit strip in the manner set out above.

Immediately after the feeding takes place, the raised portion 477 of the hub 474 engages the camming lug 478 to shift the audit strip feed operating unit toward the right to ineffective position to disengage the tenons 481 from the slots 480 in the bushing 479 prior to return movement clockwise of the shaft 239 and the arm 488. This allows the arm 488 to restore the lever 486 to normal position, as shown in Fig. 18, which, by means of the link 485, returns the bushing 482 clockwise to move the tenons 481 out of alinement with the slots 480.

If the selecting plates 492 and 493 (Figs. 15 and 18) are so positioned that the largest radii thereof are opposite the feeler fingers 490 and 491, the lever 486 will be prevented from moving in unison therewith. This will result in no movement being imparted to the bushing 482, and consequently the tenons 481 will remain out of alinement with the slots 480 in the bushing 479. When the raised portion 477 (see also Figs. 19, 20, and 21) of the hub 474 moves beyond the camming lug 478 on the face of the bushing 479, the tenons 481 of the bushings 482 will engage the face of the bushing 479 to retain the plate 471 and the disk 472 in ineffective position, as shown in Fig. 21. Consequently the stud 470 and recessed portion 496 of the disk 472 will remain out of alinement with the Geneva gear 468 and therefore no movement will be imparted to the audit strip feeding mechanism.

The mechanism just described provides a means under control of the first transaction bank and the total control keys for selectively controlling the feeding of the audit strip.

Method of operation

In explaining the method of operating the present machine, let us take as an example a public utility company supplying electrical current and gas to a plurality of consumers in a large city. Each consumer has a meter to measure the consumption of electrical current in kilowatt hours and a meter to measure the consumption of gas in cubic feet. A city is generally divided into districts of the proper size to be handled by one employee, whose duty it is to read the meters in his district periodically, generally once a month. Each district is subdivided into routes, each route being of the proper size to be covered in one day by the meter reader. There is a meter reader's book for each daily route, and these books contain in logical order and upon individual sheets the name and address of each subscriber and the route number, together with the meter readings from the previous month.

The meter reader copies the present electric and gas meter readings on each consumer's chart or sheet and manually subtracts the previous readings from the present readings and enters these differences, which in the first instance is the kilowatt hours of electricity consumed and in the second the cubic feet of gas consumed, in the proper place upon the sheet. At the end of the day the book for the route covered is turned over to the audit department, where the rate is figured from charts and the cost of the electricity and gas consumed entered upon each subscriber's sheet.

From the audit department the meter books go to the billing department, where individual bills or statement slips are made out from data contained in said meter book. An accounting machine similar to the one described herein is generally employed in printing the statement slips.

With the totalizers of the machine clear, the operator begins to make out the statement slips for a particular meter book. After all of the bills or slips are made out for that particular book, the totalizers are cleared and the portion of the audit strip (Fig. 8) covering the computations for said particular book is removed from the machine and accompanies the book to the checking department, where the statement slips and the audit strip are checked against the meter book. All the meter books for the different routes are treated in this manner.

Since this divisional application relates particularly to the audit strip and the control of its feeding and the control of the impressions thereon, the statement slips referred to above, and also the mechanism for printing upon and controlling those strips, is not shown herein and reference may be had to the parent case if a description thereof is desired.

After properly inserting the statement slip, which is referred to in the parent case, in the machine, the operator sets up on the keyboard the prior electric meter reading, in this case 32092, depresses the "Prior" key 56 (Fig. 1), and releases the machine for operation by depressing the motor bar 53. This causes the prior electric meter reading to be subtracted from the previously cleared No. 1 or add-subtract totalizer.

It will be recalled that only the seven higher denominational rows of amount keys 59 are used for printing the prior and present meter readings, as the two lower denominations do not have zero elimination, which makes them unsuitable for this purpose.

During this operation of the machine, the prior electric meter reading is simultaneously printed in the proper columns of the "Bookkeeping coupon" and "Consumer's bill" of the statement slip and upon the audit strip 403, a fragment of which is shown in Fig. 8.

Next, the present electric meter reading, 32172, is set up on the keyboard, and the "Present KWH" key 56 depressed, which, when the machine is operated, causes the present meter reading to be added to the complement of the prior meter reading contained in the add-subtract totalizer, the result being the difference between the prior and present meter readings. Also during this operation the present electric meter reading is printed in the proper columns of the statement slip, shown in the parent case, and the audit strip 403, and in both cases upon the same line as the prior meter reading.

Immediately following this operation there are two automatic machine operations, the first of which clears the add-subtract totalizer and prints the difference (in this case 80) between the prior and present meter readings, which is the kilowatt hours of current consumed, in the different columns of the statement slip and the audit strip. In the second automatic machine operation the amount of kilowatt hours consumed (80) is automatically repeated and added into a grand totalizer for kilowatt hours, represented by the "KWH" key 56 in the first transaction bank.

In the next machine operation the operator sets up the amount of the bill, in this case $6.30, which is obtained from the meter reader's book, depresses the rate key 56 in the third transaction bank corresponding to the amount of current consumed, and the "Multiple item" key 56 in the first transaction bank. Releasing the machine for operation causes the amount $6.30 to be added in the proper rate totalizer, selected by the key depressed in the third transaction bank, in a "Total $ elec." totalizer located in the zero position of the No. 2 line, selected by depressing any of the keys 58 in the third transaction bank, and this amount is also added in the "Multiple item" totalizer on the No. 1 line selected by the "Multiple item" key 56. Also in this operation the amount of the electric bill, $6.30, is printed in the amount column of the audit strip 403.

In the next column the prior gas meter reading (67933) is set up on the amount keys, the "Prior" key 56 depressed, and the machine released for operation by depressing the motor bar 53. During the initial part of this operation the statement slip and the audit strip 403 are line-spaced, which is effected by depressing the "Multiple-item" key 56 in the preceding operation. In this operation the prior gas meter reading is printed upon the statement slip and upon the second line in the proper column of the audit strip 403, and this prior meter reading is also simultaneously subtracted from the cleared No. 1 or add-subtract totalizer.

In the next operation of the machine the present gas meter reading (67963) is set up on the keyboard, the "Present 100$^s$ cu. ft." key 56 depressed, and the machine released for operation. During this operation of the machine the present meter reading is printed in the proper columns of the statement slip and the audit strip, and simultaneously added to the complement of the prior meter reading contained in the add-subtract totalizer. The result of this computation is the difference between the present and prior meter readings (30), which is the hundred cubic feet of gas consumed by the subscriber.

In the first of the two succeeding automatic operations, the add-subtract totalizer is cleared and the difference between the present and prior meter readings (30) is printed in the proper columns of the statement slip and the audit strip 403. In the second automatic machine operation the difference (30) between the present and prior gas meter readings is added in a grand totalizer for the gas consumed represented by the "100$^s$ cu. ft." key 56 in the first transaction bank.

In the next machine operation the price of the gas consumed, in this case $3.60, is set up on the amount keys, the proper gas rate key 57 in the second transaction bank and the "Multiple-item" key 56 in the first transaction bank are depressed, and the machine released for operation. In this operation the amount ($3.60) is printed on the statement slip and in the amount column of the audit strip 403. This amount ($3.60) is also simultaneously added in the proper rate totalizer on the No. 2 line selected by the key depressed in the second transaction bank, and in a "Total $ gas" totalizer located in the zero position of the No. 3 line, selected by depressing any key 57 in the second transaction bank. This amount is likewise added to the amount of the electric bill contained in the "Multiple item" totalizer located on the No. 1 line and selected by the "Multiple item" key 56.

In the final operation the "Multiple item" key 56 in the first transaction bank, together with the "Reset" key 55 for the first transaction bank, is depressed and the machine released for operation. At the beginning of this operation the statement slip and the audit strip are again line-spaced, after which the "Multiple item" totalizer is cleared and the total amount of the bill, $9.90, is printed on the statement slip and in the amount column of the audit strip 403.

It is estimated that 90% of the errors made by meter readers are in subtracting the prior from the present meter readings, to determine the consumption, and only 10% of the errors are made in copying the meter readings. Due to the fact that the instant machine mechanically calculates the consumption, an excellent means is provided for checking the meter reader's calculations.

In case the statement slip contains only a single item, for example, electricity, in the final operation for that item, when the amount of the bill, $6.30, is printed, instead of depressing the "Multiple item" key in the first transaction bank, the "Single item" key 56 is depressed. This causes the bill to be returned forwardly near the end of the machine operation and presented to the ejecting mechanism.

After all the statements have been made out for a particular meter book, the "KWH" totalizer on the No. I line is released to print the grand total kilowatt hours consumption (1826) upon the audit strip. This is accomplished by depressing the "KWH" key 56 in conjunction with the first bank "Reset" key 55 and releasing the machine for operation, by means of the "Motor bar" 53.

Next, the grand total ($114.50) of electric amounts is printed upon the audit strip by clearing the "Total $ Elec." totalizer on the No. 2 line. This is accomplished by depressing the second bank "Reset" key 55 and releasing the machine for operation.

After this the grand total (1600) of the hundred cubic feet of gas consumed is printed upon the audit strip by clearing the "100s cu. ft." totalizer on the No. I line. This is accomplished by depressing the "100s cu. ft." key 56 in conjunction with the first bank "Reset key 55" and operating the machine.

Finally the "Total $ Gas" totalizer on the No. 3 line is cleared to print the grand total ($155.10) of gas amounts upon the audit strip. This is accomplished by depressing the third bank "Reset" key 53 and releasing the machine for operation in the usual way.

After this, the meter book, the statement slips for that particular book, and the portion of the audit strip 403 containing all the transactions in said particular book are placed together and turned over to the audit department for checking. In this final check-up the mechanical entries on the audit strip 403 are compared with the entries in the meter reader's book, and the amounts arrived at by the auditing department. This latter includes a grand total of the electrical current consumed, a grand total of the cost of this current to the consumer, a grand total of the gas consumed, and a grand total of the cost of this gas to the consumer.

While the form of mechanism here shown and described is admirably adapted to fulfill the objects primarily stated, it is to be understood that it is not intended to confine the invention to the form or embodiment herein disclosed, for it is susceptible of embodiment in various forms all coming within the scope of the claims which follow.

What is claimed is:

1. In a machine of the class described adapted to print records on an audit strip, the combination of means to move the strip to and from printing position; means to operate the moving means; means to feed the strip; and means cooperating with the feeding means and the operating means and controlled by the operating means to render the feeding means operable to feed the strip when the feeding means is operated.

2. In a machine of the class described adapted to print on a record strip, the combination of means to move the strip to and from printing position; a main operating device; means to feed the strip; means to control the effectiveness of the feeding means; and means cooperating with the main operating device to operate the moving means and to operate the means which controls the effectiveness of the feeding means to render the feeding means effective to feed the strip when the feeding means is operated during an operation of the moving means.

3. In a machine of the class described adapted to print on a record strip, the combination of means to move the strip to and from printing position; a main operating device; means to feed the strip; means to press the strip into contact with the feeding means; and an element cooperating with the main operating device to operate the moving means and to effectuate the pressing means.

4. In an accounting machine adapted to print records on an audit strip, the combination of a receiving reel for the strip; means to feed the strip; means to resiliently press the strip into contact with the feeding means to enable the feeding means to feed the strip; means to render the pressing means effective; means to operate the feeding means; and means including a slippage element to transmit the movement of the feeding means to the reel.

5. In an accounting machine adapted to print records on an audit strip, the combination of a receiving reel for the strip; means to move the strip to and from printing position; means to feed the strip; means to operate the moving means and to effectuate the feeding means; and means including a slippage element to transmit the movement of the feeding means to the receiving reel.

6. In a machine of the class described adapted to print records on an audit strip, the combination of a receiving reel for the strip; means to feed the strip; means to press the strip into contact with the feeding means; means to operate the feeding means and to render the pressing means effective; and means including a slippage element to transmit the movement of the feeding means to the receiving reel.

7. In a machine of the class described, the combination of means to print records on an audit strip; a receiving reel for the audit strip; means to move a section of the audit strip to and from printing position; a main operating device; means to feed the strip; means to resiliently press the strip into contact with the feeding means; a member cooperating with the main operating device to operate the moving means and to effectuate the pressing means; means connecting the main operating device to the feeding means; and means including a slippage element to transmit the movement of the feeding means to the receiving reel.

8. In a machine of the class described, the combination of means to print records on an audit strip; a receiving reel for the audit strip; a laterally shiftable table to move a section of the strip to and from printing position; a main operating device; a roll to feed the strip; means to resiliently press the strip into contact with the feeding roll; a member cooperating with the main operating device to shift the table and to effectuate the pressing means; means connecting the main operating device to the feeding roll; and means to control the connecting means.

9. In an accounting machine, the combination of means to print records on an audit strip, which is unwound from a supply roll and wound upon a receiving reel; a laterally shiftable table to move a portion of the strip to and from printing position; a main operating device; a feed roll for the strip; means to yieldingly hold the strip in contact with the feeding roll; a member cooperating with the main operating device to shift the table and to effectuate the holding means; means connecting the main operating device to the feeding roll; means to control the connecting means; and means including clutch mechanism to transmit the movement of the feeding roll to the receiving reel.

CHARLES H. ARNOLD.